(12) United States Patent
Rensing

(10) Patent No.: US 10,921,287 B2
(45) Date of Patent: Feb. 16, 2021

(54) DRIVE COIL FOR EDDY CURRENT INSPECTION PROBE

(71) Applicant: Zetec, Inc., Snoqualmie, WA (US)

(72) Inventor: Noa M. Rensing, West Newton, MA (US)

(73) Assignee: ZETEC, INC., Snoqualmie, WA (US)

(*) Notice: Subject to any disclaimer, the term of this patent is extended or adjusted under 35 U.S.C. 154(b) by 159 days.

(21) Appl. No.: 15/747,878

(22) PCT Filed: Jul. 27, 2016

(86) PCT No.: PCT/US2016/044229
§ 371 (c)(1),
(2) Date: Jan. 26, 2018

(87) PCT Pub. No.: WO2017/019755
PCT Pub. Date: Feb. 2, 2017

(65) Prior Publication Data
US 2018/0224402 A1 Aug. 9, 2018

Related U.S. Application Data

(60) Provisional application No. 62/197,963, filed on Jul. 28, 2015.

(51) Int. Cl.
*G01N 27/90* (2006.01)
*G01N 27/904* (2021.01)
*G01N 27/9013* (2021.01)

(52) U.S. Cl.
CPC ......... *G01N 27/904* (2013.01); *G01N 27/902* (2013.01); *G01N 27/9006* (2013.01);
(Continued)

(58) Field of Classification Search
CPC ............. G01N 27/904; G01N 27/9006; G01N 27/9013; G01N 27/902; G01N 27/9033; G01N 27/9046

See application file for complete search history.

(56) References Cited

U.S. PATENT DOCUMENTS 4,855,677 A * 8/1989 Clark, Jr. ............. G01N 27/904
324/238
5,434,506 A 7/1995 Flora
(Continued)

FOREIGN PATENT DOCUMENTS

CA 2099684 A1 12/1993
EP 0019091 A1 11/1980
(Continued)

OTHER PUBLICATIONS

International Search Report and Written Opinion issued for the corresponding PCT application No. PCT/US2016/044229, dated Apr. 11, 2016, 13 pages.

*Primary Examiner* — Tung X Nguyen
*Assistant Examiner* — Feba Pothen
(74) *Attorney, Agent, or Firm* — Snyder, Clark, Lesch & Chung, LLP

(57) ABSTRACT

A drive coil assembly to generate a specific spatial distribution of eddy currents within the walls of a conductive tube or pipe, which may be used in conjunction with a separate array of magnetic sensors to detect defects in the tubing wall. The drive coil assembly comprises a plurality of coils which are generally wrapped around the circumference of a cylindrical probe body, but which are further shaped with serpentine undulation in the axial direction. The undulation is characterized by a spatial amplitude, a spatial phase and a spatial frequency; typically, the spatial frequency results in an integer number of undulations around the circumference of the drive coil and the phase is chosen to uniformly distribute the lobes about the circumference. The temporal phase of the electrical current in each coil is chosen to null out net current of the assembly around the circumference.

19 Claims, 16 Drawing Sheets

(52) U.S. Cl.
CPC ..... *G01N 27/9013* (2013.01); *G01N 27/9033* (2013.01); *G01N 27/9046* (2013.01)

(56) References Cited

U.S. PATENT DOCUMENTS

| | | | |
|---|---|---|---|
| 5,623,203 A | | 4/1997 | Hosohara et al. |
| 8,269,434 B2 * | | 9/2012 | Welchko .................. B60K 1/00 318/139 |
| 2012/0019236 A1 * | | 1/2012 | Tiernan .............. G01N 27/9033 324/234 |
| 2016/0025682 A1 * | | 1/2016 | Walker ............... G01N 27/9033 324/222 |

FOREIGN PATENT DOCUMENTS

| | | | |
|---|---|---|---|
| JP | 7-72123 A | | 3/1995 |
| JP | 8-43356 A | | 2/1996 |
| JP | H1151905 A | | 2/1999 |
| JP | 2009069090 | * | 4/2009 |

* cited by examiner

Figure 2
Prior Art
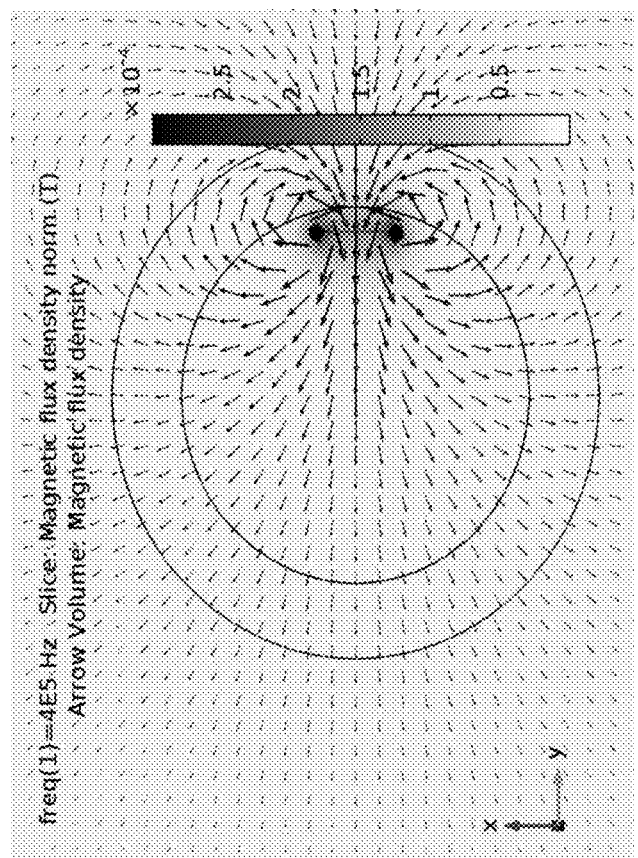
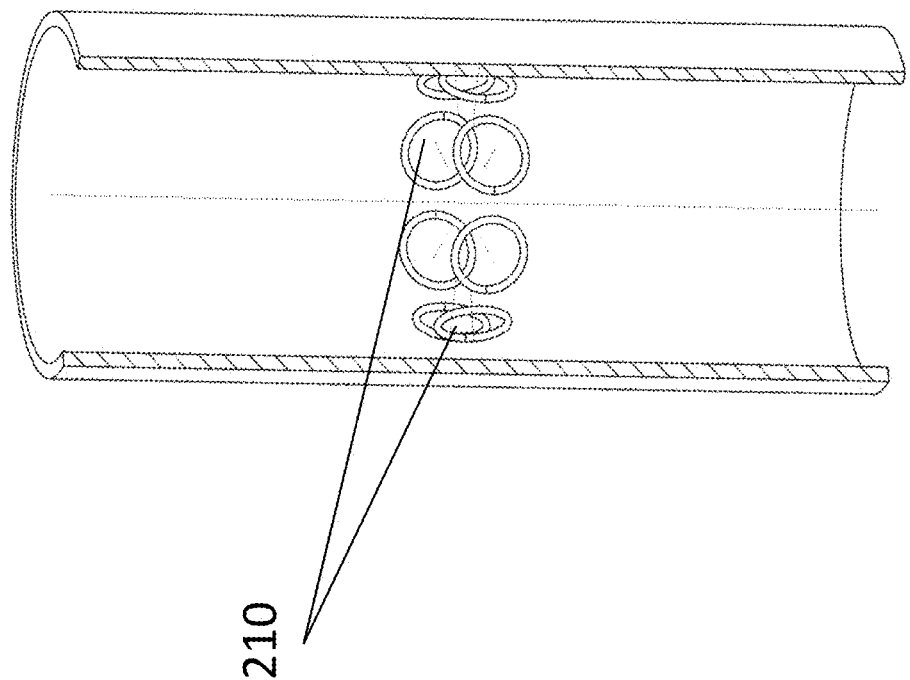
210

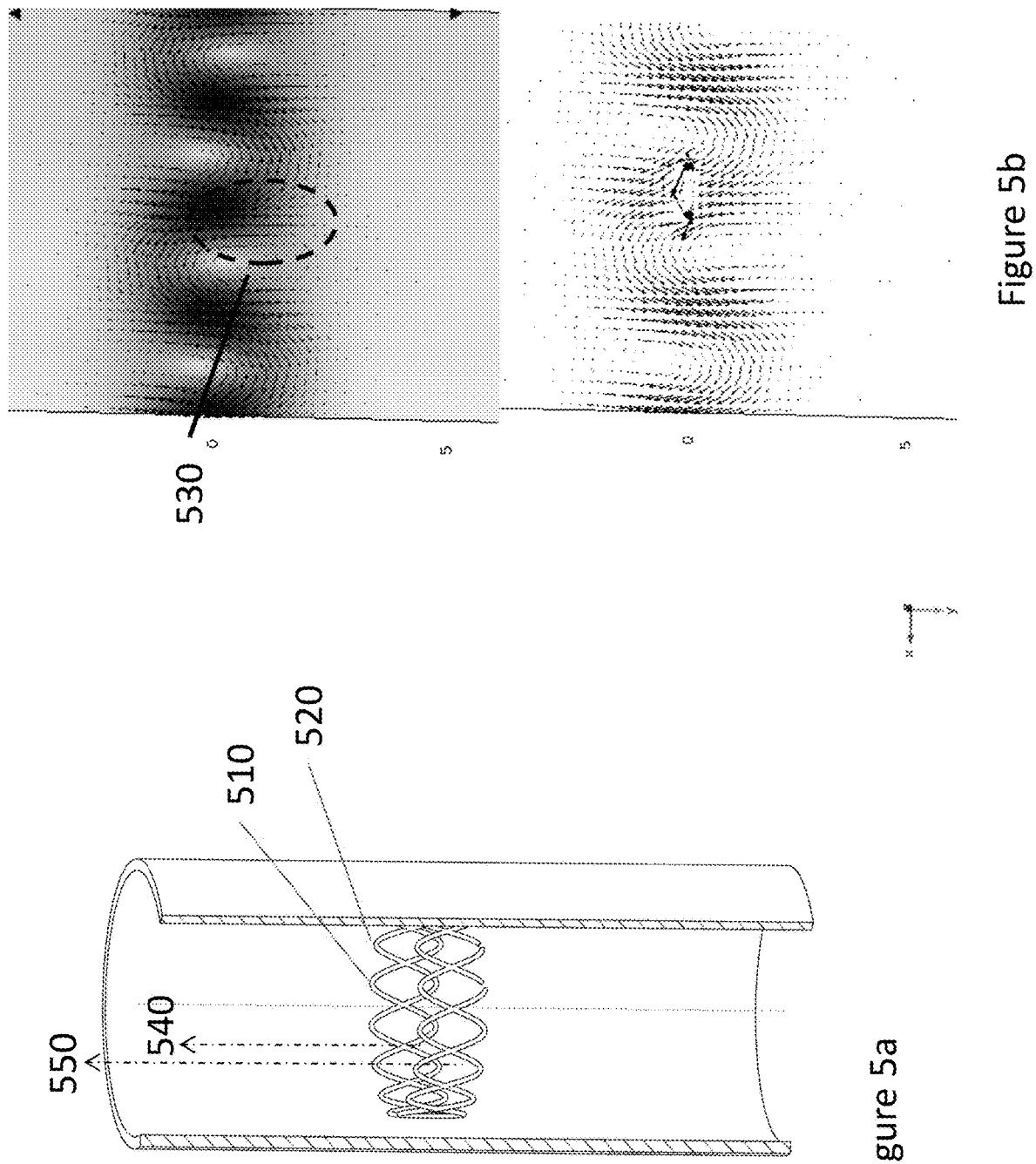

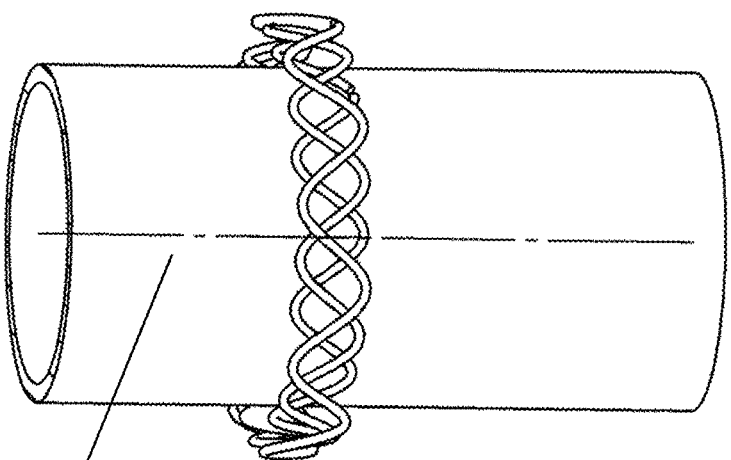
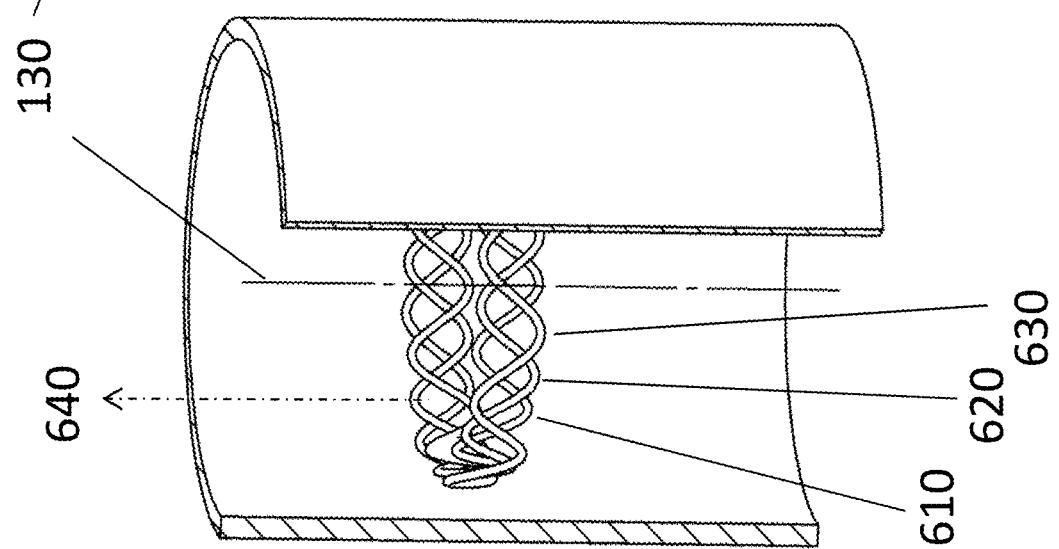

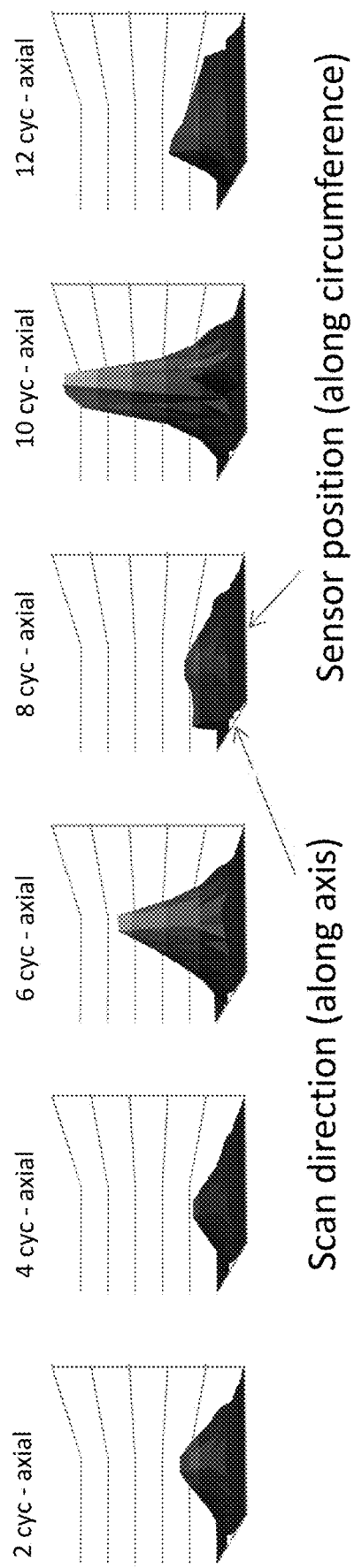
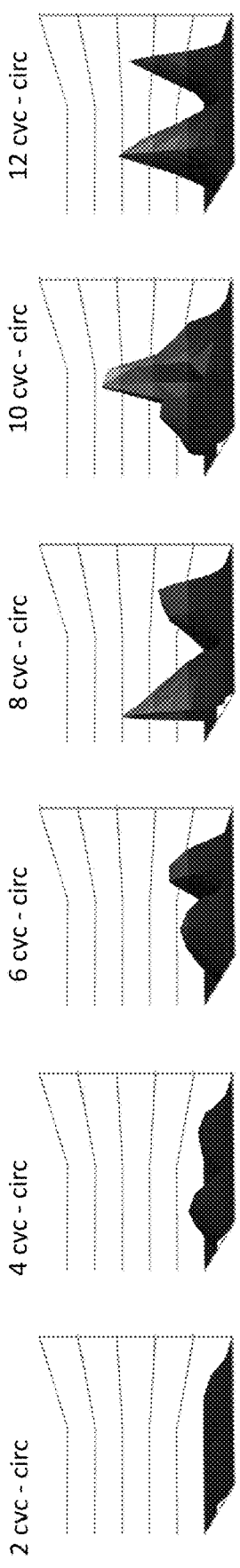

DRIVE COIL FOR EDDY CURRENT INSPECTION PROBE

RELATED APPLICATIONS

This PCT application claims the benefit under 35 U.S.C. § 119(e) of provisional application Ser. No. 62/197,963 filed Jul. 28, 2015 titled Drive Coil for Eddy Current Inspection Probe. The entire provisional application is incorporated herein by reference.

BACKGROUND OF THE INVENTION

Bobbin Probes

Bobbin style eddy current probes have been used for decades for non-destructive inspection of pipes and tubing made from electrically conducting material; FIG. 1 shows a schematic of the bobbin probe geometry. The bobbin 110 consists of a coil of wire, coaxial with the tube under inspection 120. To perform an inspection, an oscillating voltage is applied to the coil and the bobbin is translated through the tube along the tube axis 130. This voltage creates a current, generating a magnetic field which in turn induces eddy currents in the tube. This electromagnetic coupling to the tube constitutes a load on the coil and thus the system may be characterized by monitoring the electrical impedance. Holes, cracks, inclusions, or other defects in the tube wall modify the coupling and therefore the impedance.

The magnetic field distribution, which is shown adjacent to the schematic diagram, created by a bobbin probe is that of a simple magnetic dipole. Bobbin probes are simple to construct and drive, but suffer from several significant limitations including: (1) The eddy currents flow direction is purely circumferential and as a result the system is much more sensitive to defects parallel to the axis to the tube than to defects which are oriented parallel to the circumference of the tube; (2) The magnetic field distribution extends considerably outside the tube, so the arrangement is sensitive to conductive structures outside the tube, including support beams, manifolds, etc.; and (3) The arrangement cannot detect the circumferential position of the defect Over the decades, several improvements have been made to address these limitations:

Tangential Array Probe

A tangential array probe shown schematically in FIG. 2 consists of an array of miniature circular coils 220 arranged in a circular array around the circumference of the probe, with the axis of each coil oriented along a radial direction and the plane of each coil tangential to the circumference of the probe. The Zetec X-probe is an example of such a probe. The array may have as many as several dozen coils, and may consist of either a single or several bands of coils. The coils are typically driven sequentially, either individually or in pairs or triads using a multiplexing scheme that is optimized to balance probe sensitivity, resolution, and inspection speed. When each coil is driven separately, the magnetic field distribution for each coil is a simple magnetic dipole with its axis coincident with the coil axis, which in turn is coincident with a diameter of the probe. This is shown in the diagram adjacent to the schematic of FIG. 2, which depicts flux density based on arrow volume.

This type of probe can be designed to be equally sensitive to both axial and circumferential defects, and because each coil is small, the geometric extent of the magnetic field distribution is limited and the probe is relatively immune to structures outside the tube. This type of design, however, demands a high performance multiplexer, since the coils are an inductive load and the switching must be both rapid to maintain the inspection speed and complete to minimize cross-talk. The coils must be multiplexed because if they are all driven simultaneously in the same direction, the eddy currents due to adjacent coils may cancel in the region between the coils, reducing the efficacy of the arrangement. Furthermore, winding, matching, mounting, and aligning a large number of coils is a delicate and expensive manufacturing process. One limitation of this type of arrangement is that as the probe translates through a tube or pipe, some sections of the pipe wall experience primarily circumferential currents while other sections will experience primarily axial currents. Thus the sensitivity to defects with different orientations may depend on their exact position relative to the coils in the probe. When the eddy currents flow along a direction that is predominantly circumferential, for example, in the regions near the paths traversed by the center of each coil, the probe is particularly sensitive to defects which are oriented parallel to the axis of the tube (and therefore the axis of the probe). Conversely, if the eddy currents encountered by a potential defect were to flow predominantly along a direction parallel to the axis of the tube, as would occur, for example, in the sections near the point of tangency between adjacent coils, the probe would be most sensitive to flaws which are oriented along the circumference of the probe.

Rotating Field Probe

In a rotating field probe, two coils of wire are used. FIG. 3 is a schematic of the geometry. A first coil 310 is arranged such that its plane contains the axis of the tube, and the second coil 320 is arranged so that its plane also contains the axis of the tube and its normal is perpendicular to the normal of the first coil 310 and the centers of the coils 310 and 320 are coincident, so that the axis of the tube is coincident with the intersection of the two coils. Thus the magnetic field generated by each coil is a magnetic dipole which intersects the tube at two points along a diameter of the tube. In this design, both coils are typically driven at the same frequency, but the phase of the excitation of the second coil lags (or leads) the phase of the excitation of the first coil by 90°, so that the dipole magnetic field rotates around the circumference of the tube at the coil drive signal frequency. Optionally, the coils may be driven with a time varying phase or at frequencies which are not the same for the two coils, which will result in a rotation frequency that is different from the drive signal frequency. The detection may be accomplished either by monitoring the impedance of the drive coils or by using a separate magnetic field sensor or sensor array. The sensor may be a wound wire coil, a solid state sensor, or any other sensor known in the art.

This design is equally sensitive to circumferential and axial defects and can provide some circumferential resolution. However, this still suffers from certain limitations: (1) The magnetic fields extend well outside the tube and therefore interact with external structures; and (2) while the circumferential location of a defect can in some cases be obtained from the phase of the signal, the phase of the signal also contains information about the depth, size, and shape of the defect, and therefore these cannot be independently determined by this method.

In many eddy current probes, including the X-probe and similar designs, the same coils are used (either simultaneously or at separate times) as both drive coils and detectors. Solid state magnetic detectors can also be used and may offer advantages in cost, size, and uniformity over wound-wire coils. However, the manufacturing advantage of using solid state sensors may not be fully realized, if wound-wire coils must also be incorporated into the probe to generate the eddy currents. Thus, a drive coil design that does not depend on a large number of miniature coils, such as the present invention described below, is especially advantageous when the probe utilizes arrays of solid state sensors as the detector.

In summary it is desirable to devise a drive current design which creates an eddy current distribution whose direction varies as a function of time and/or probe position, such that every location within the tube wall experiences predominantly circumferential eddy current during some portion of the inspection and predominantly axial eddy currents during a different a different portion of the inspection. Alternately, the predominant eddy current directions may be at other angles, as long as the eddy currents directions at each point in the tube wall flow along at least two different directions, which are preferably perpendicular to each other, at different times during the scan of the probe.

It is furthermore desirable to create such a time and/or position varying eddy current distribution without resorting to multiplexing discrete drive coils, because multiplexers add complexity and fabrication cost to the probe and can adversely impact the rate at which a tube may be inspected.

SUMMARY OF THE INVENTION

A first aspect of the invention is an eddy current generation structure for inspection of a tubular object comprising electrically conductive material, said structure having a circular perimeter and comprising one or more current carrying paths, wherein the paths are substantially concentric about a common axis and are further spatially modulated in the axial direction, so that each of the one or more paths has an integer number of axial undulations around the perimeter of the structure.

In a further aspect of the invention, the undulations are shaped to optimize the distribution of eddy current in the wall of the tubular object. In a further aspect of the invention these undulations have a shape that is either a sinusoidal shape; a trapezoidal shape; a cycloid or related function.

In a further aspect of the invention, there are plurality of current paths each having a spatial phase relationship to each other and the spatial phases of the undulations of the current paths are arranged such the undulations are uniformly distributed about the circumference of the system.

In a further aspect of the invention, there are plurality of current paths wherein temporal phase of the electrical current in each path is fixed and the temporal phases of the different paths are configured so that net current about the common axis is zero.

In a further aspect of the invention, there are plurality of current paths wherein the temporal frequency of the electrical current in each of the conducting paths is the same In a further aspect of the invention, there are plurality of current paths wherein the temporal frequency of the different electrical currents in each of the conducting paths is different In a further aspect of the invention, there are included a first array of magnetic field sensors. In a further aspect of the invention, the current carrying paths produce a background magnetic field and where spatial phase and pitch of the location of the array of magnetic field sensor is configured to provide symmetries in the background field.

In a further aspect of the invention, the current carrying paths produce a background magnetic field and wherein said magnetic field sensors are oriented to detect a directional component of the magnetic field. In a further aspect of the invention, the directional component is one of the group consisting of: normal to a surface of the tubular object: parallel to the axis of the tubular object and tangential to a surface of the tubular object.

In a further aspect of the invention, the first sensor array comprises sensors selected from the group consisting: of inductive coils, solid state sensors, AMR sensors, GMR sensors, Hall sensors, valve sensors, TMR sensors and magneto-optic sensors.

In a further aspect of the invention there is included a second sensor array wherein the first sensor array is located axially adjacent to a first side of said current carrying path and said a second sensor array is located axially adjacent to a second side of said current carrying path. In a further aspect of the invention, the second sensor array is utilized to provide a signal reference for differential sensing. In a further aspect of the invention, the second sensor array is utilized to increase the circumferential resolution of the instrument.

The current carrying paths can are fabricated of discrete wires, photolithographically produced conductors, subtractive fabrication, additive fabrication or any combination of these.

The current carrying paths can be fabricated on a flexible substrate which is subsequently formed into a cylindrical shape or directly formed on a rigid or semi-rigid probe body.

A further aspect of the invention is an eddy current generation structure for inspection of an object of planar or arbitrary shape comprising electrically conductive material, the structure having a substantially planar disposition and a linear axis contained within the plane, the structure comprising a plurality of current carrying paths, wherein the paths are generally disposed along a common axis and are further spatially modulated in the plane in the direction orthogonal to the axis, so that each path has an integer number of axial undulations, and the spatial phase of the undulations relative to each of the current carrying paths is uniformly distributed along the common axis.

In a further aspect of the structure for planar or arbitrary shaped object inspection the eddy current generating structure can be supported on a rigid flat substrate, a rigid shaped substrate, a flexible substrate, or an articulated substrate In a further aspect of the structure for planar or arbitrary shaped object inspection there are included one or more magnetic sensors.

BRIEF DESCRIPTION OF THE DRAWINGS

FIG. 2 is a schematic of a prior art tangential array probe and magnetic field associated with it;

FIG. 5*a* is schematic of an exemplary multi winding probe according to an aspect of the invention;

FIG. 5*b* shows the eddy current distribution on the near and far side of a moderately thick wall for an exemplary probe as shown in FIG. 5*a;*

FIG. 6*a* is schematic of an exemplary multi-winding probe according to an aspect of the invention;

FIG. 6*b* is schematic of an exemplary multi-winding probe according to an aspect of the invention;

FIG. 6c shows the eddy current at the near side of the inner wall for the configuration illustrated in FIG. 6a;

FIGS. 10a and 10b show the same data as FIGS. 9a and 9b, normalized to the local background field;

FIG. 13b shoes the magnetic field of the design of FIG. 13a.

DETAILED DESCRIPTION OF THE INVENTION

Figure 1:
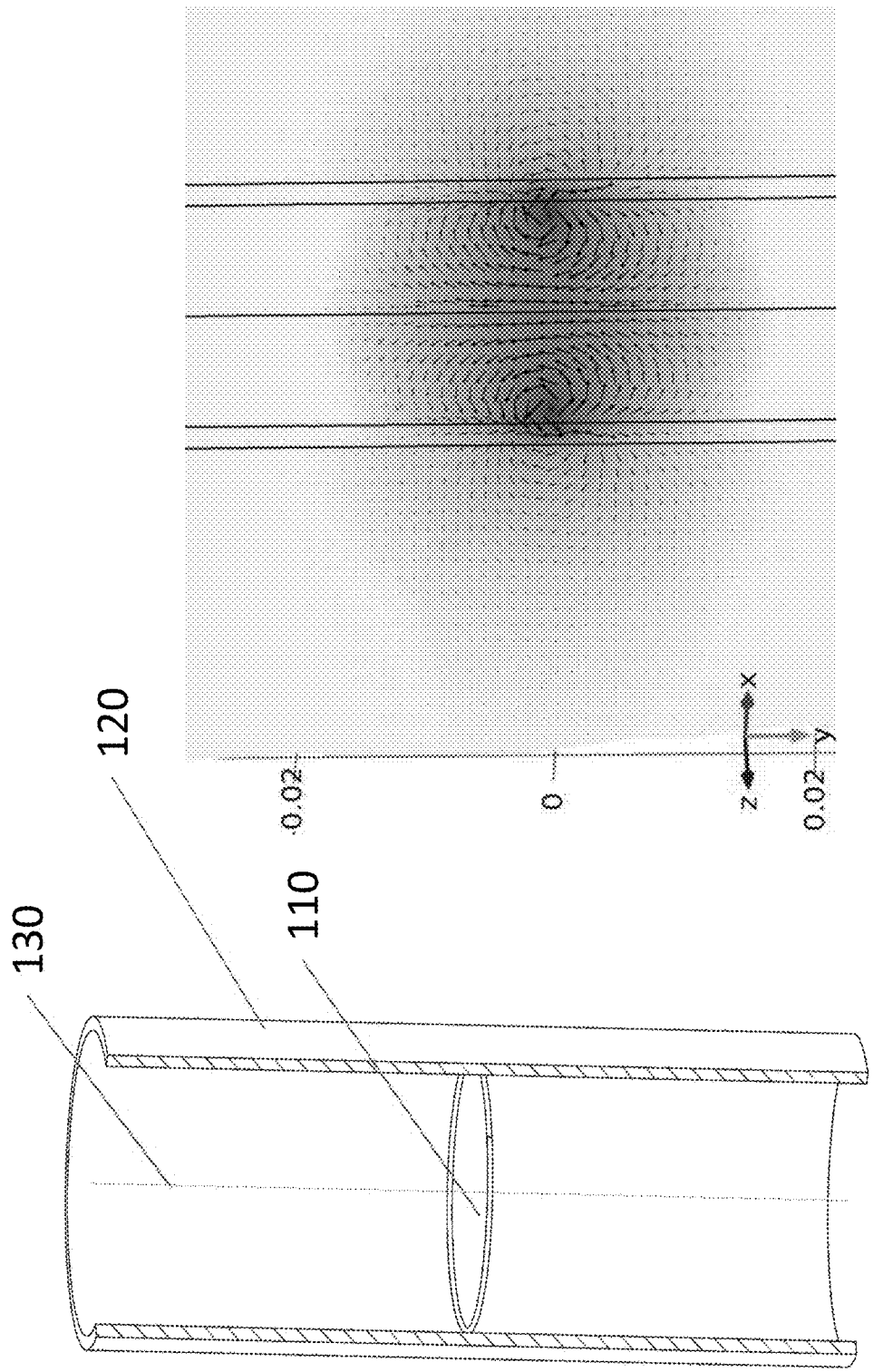
FIG. 1 is a schematic of a prior art bobbin probe and magnetic field associated with it.
Figure 3:
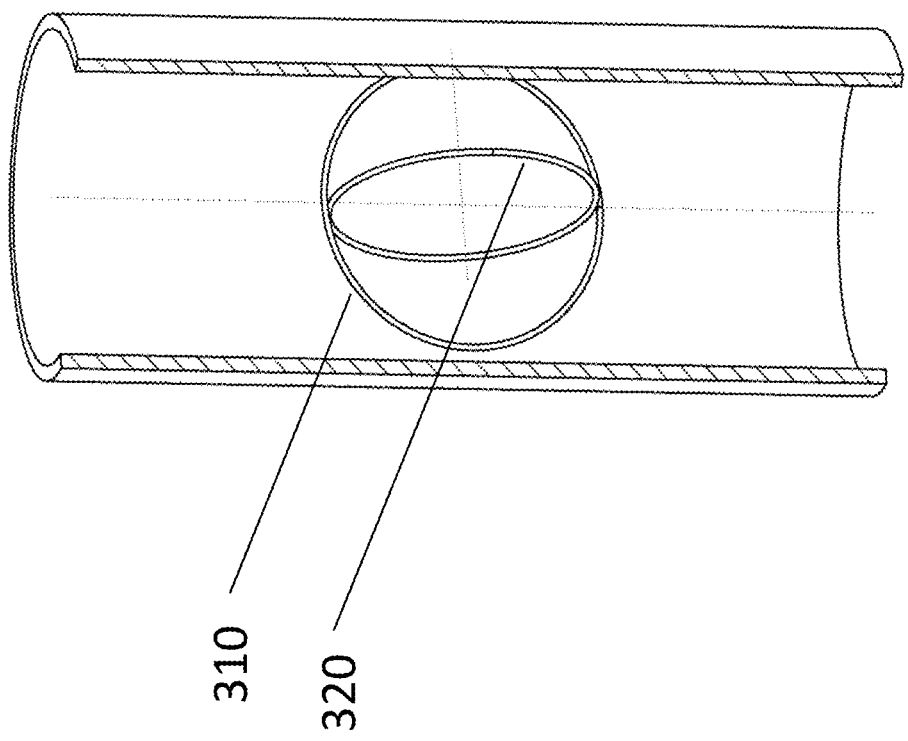
FIG. 3 is a schematic of a prior art rotating field probe.
Figure 4B:
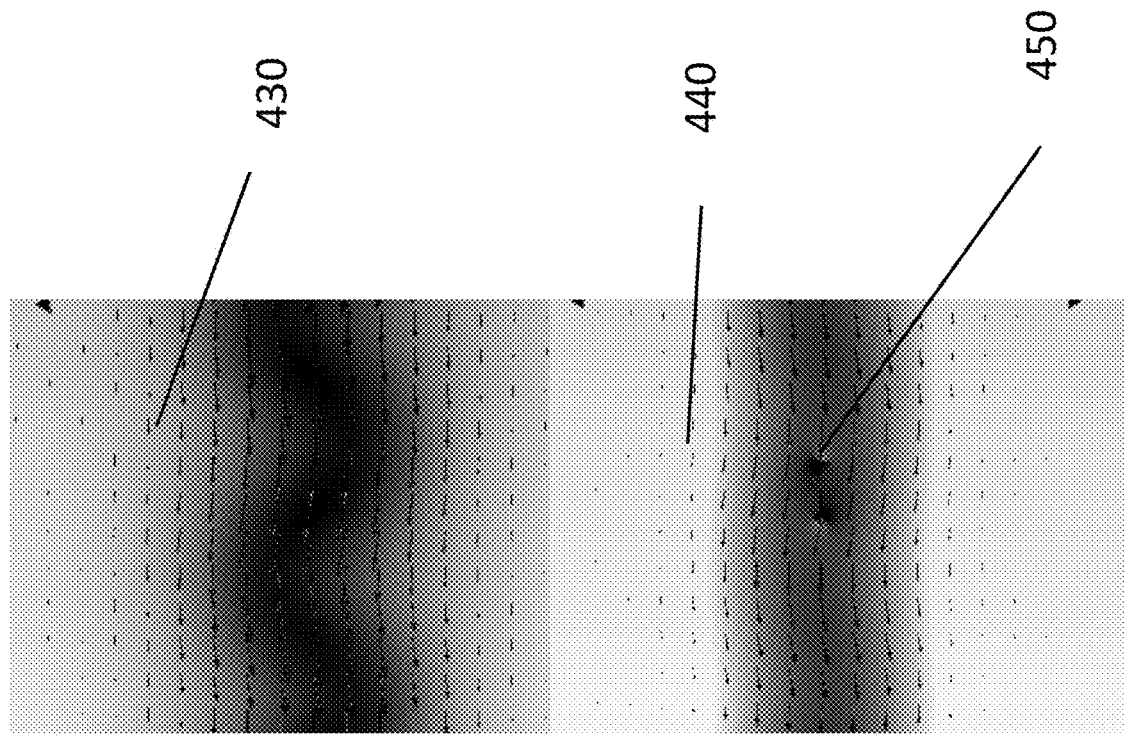
FIG. 4*b* shows the eddy current distribution on the near (top) and far (bottom) side of a moderately thick wall for an exemplary probe according to an aspect of the invention.
Figure 4A:
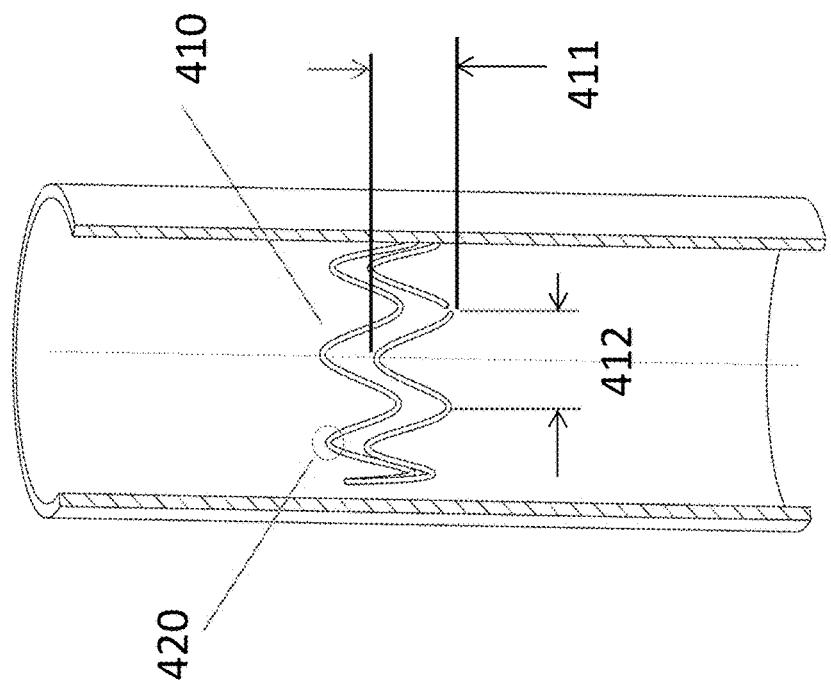
FIG. 4*a* is schematic of an exemplary probe according to an aspect of the invention.

In an embodiment of the present invention is to modify a traditional bobbin drive coil design, so that it is further shaped with serpentine undulation in the axial direction. A schematic diagram of such a geometry is shown in FIG. 4. The undulation 410 may be characterized by a spatial amplitude 411 and a spatial period 412; typically, the spatial frequency would be chosen to give an integer number of undulations around the circumference of the drive coil. A sinusoidal coil such as the one shown in FIG. 4a may be described by the parametric equations $$x = R\cos(t)$$

$$y = R\sin(t)$$

$$z = A\cos(nt+\varphi)$$

Where the parameter t varies in value between 0 and 2*pi: $0 \le t \le 2*\pi$. R, the radius of the coil, is typically slightly smaller than the inner radius of the tube for an internal probe and slightly larger than the outside radius of the tube or pipe for an external probe, A is the amplitude of the undulations, n is the number of lobes, and $\varphi$ is the undulation phase in radians for that path, and the axes of the tube and probe are both aligned with the z axis.

The eddy current created by such a coil flows in different directions at different points around the circumference of the tube, but generally each region of the tube wall only experiences one particular direction of eddy current, and thus the sensitivity in each region is substantially reduced for defects parallel to that direction. That is, a region of the tube that is, for example, adjacent to circumferential segments of the drive coil 420 would only experience circumferential eddy currents and would not at a different time during the measurement experience axial eddy currents. Such a system would be sensitive to axial defects in some regions, and to circumferential defects in other regions. Furthermore, the spatial modulation in the eddy current direction diminishes with increasing depth into the wall, so that for a sufficiently thick pipe wall, the eddy current distribution on the far side of the tube wall is indistinguishable from the eddy current distribution for a simple bobbin drive coil. The graph in FIG. 4 shows the eddy current distribution on the near side of the wall 430 (inner wall for an internal probe and outer wall for an external probe) and far side of the wall 440 of a moderately thick wall. It can be seen from the figures that the axial modulation of the current distribution is significantly diminished for the far side wall. Thus the current would be primarily parallel to a circumferential defect 450 in the far wall. In addition, the magnetic field distribution for this drive coil would again be a large dipole similar to that of a bobbin probe, so that fields interact with external objects or structures and therefore the eddy current measurement is sensitive to external objects or structures.

To mitigate some of these shortcomings, in a further embodiment two serpentine coils arranged as shown schematically in FIG. 5, so that the circumferential phase of the spatial undulations of the second coil 520 is offset from that of the first coil 510 by 90° (in the above equations, $\varphi = 2*\pi/4$), and furthermore the temporal phase of the current through the two rings is offset by 180°, so that the net current around the circumference of the probe is zero. This configuration is roughly equivalent to a circular array of closed circulating paths dispersed around the circumference of the probe. The induced eddy current distribution also comprises closed circulating paths 530, and these paths are preserved through the thickness of the wall even for thick walled pipes, as shown in the diagrams to the right of the schematic in FIG. 5. Furthermore, each circulating path is associated with a small, localized magnetic dipole, reducing the interaction with external objects or structures. However, as the probe translates axially through the pipe or tube, some regions, for example along path 540, experience currents that vary in direction, while others, for example along path 550, experience eddy currents along one direction, in this case circumferential.

Figure 6C:
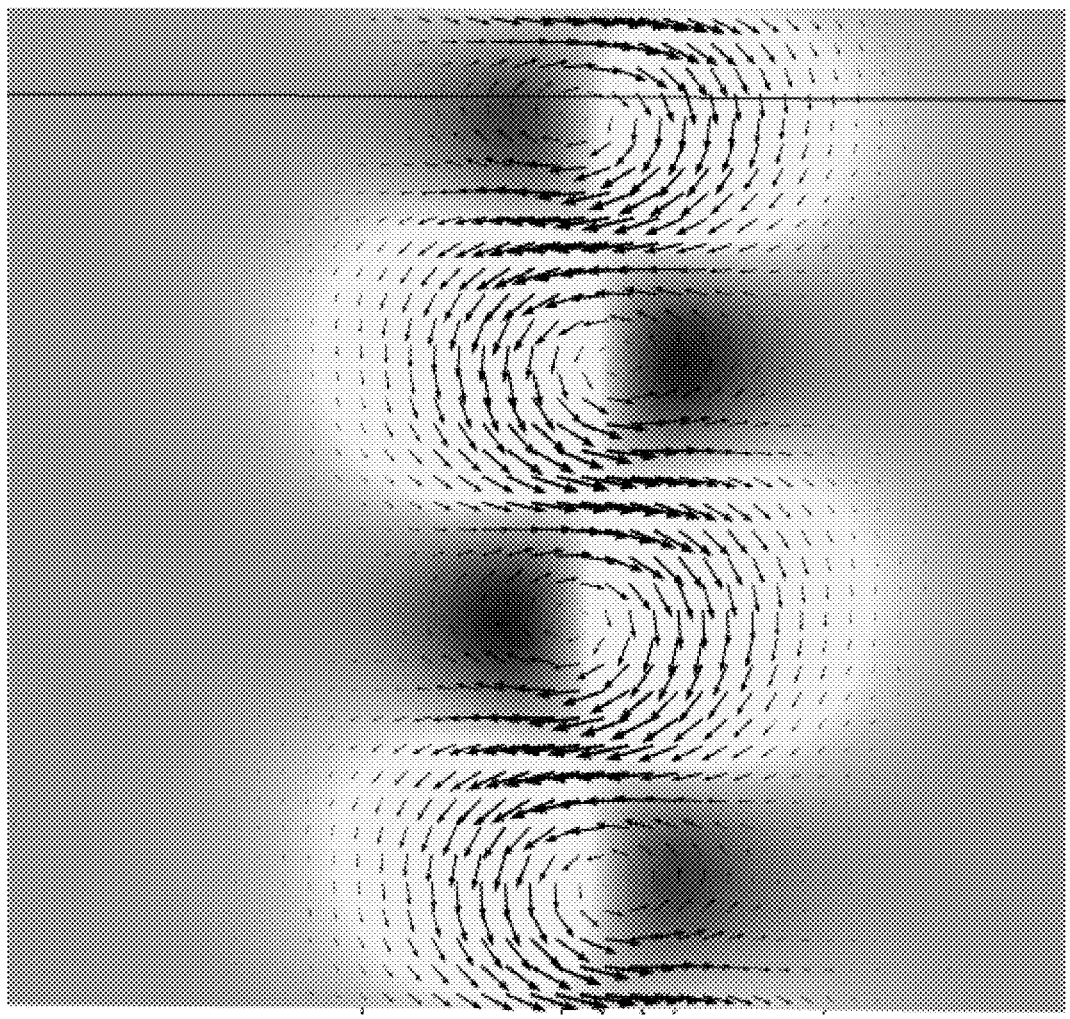
Figure 6E:
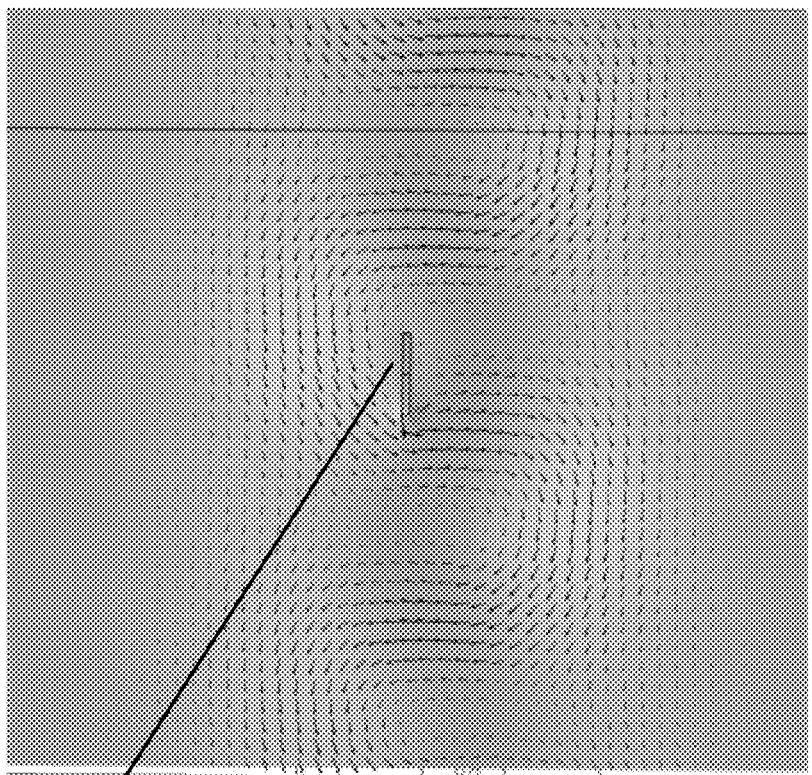
FIG. 6e shows the eddy current intensity and direction in the outer surface of a tube wall with a circumferential defect on the far wall for a 90 degree phase shifted signal.
Figure 6D:
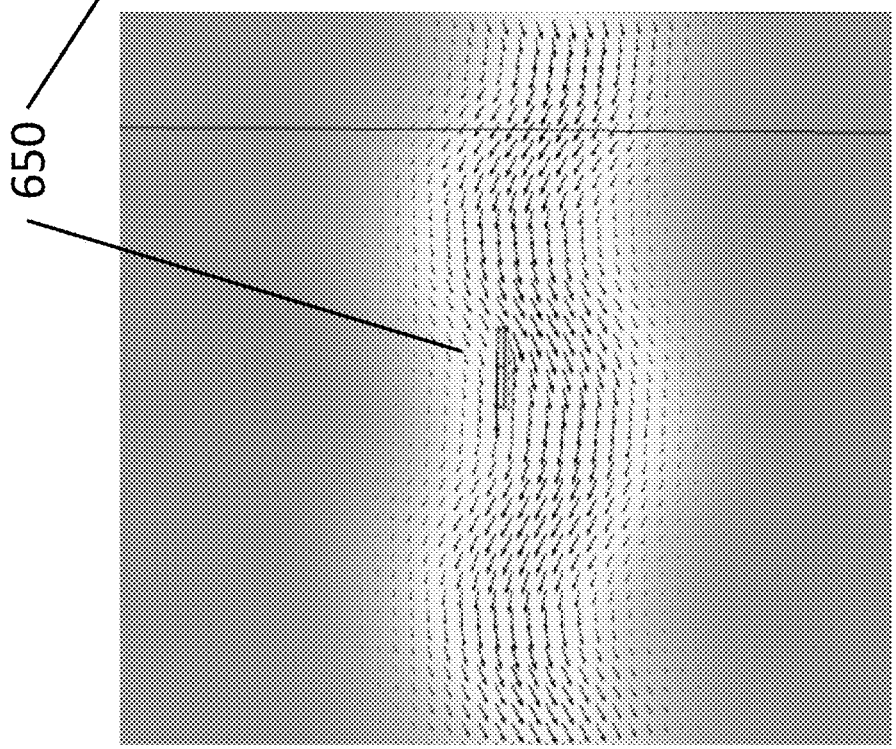
FIG. 6d shows the eddy current intensity and direction in the outer surface of a tube wall with a circumferential defect on the far wall for an in phase signal.

A further improvement may be achieved as shown in FIG. 6 by utilizing three serpentine coils 610, 620, and 630, with a relative spatial phase of 60° between any pair of coils and a relative temporal phase of 120°, as shown in FIGS. 6a and 6b. In this case each region of the tube wall experiences eddy currents that flow in different directions as the probe is translated transversely through the pipe. For example, along path 640 the predominant direction of the eddy current is first circumferential, and then canted at 120° in one direction, and finally canted in the opposite direction, also at 120°. FIG. 6c shows the eddy current at the near side of the wall (the inner wall for the configuration illustrated) and FIGS. 6d and 6e show the far-side wall eddy current intensity and direction at two different points in the temporal oscillation of the excitation. The predominant current direction at the location of a circumferential defect 650 is shown to be different at the two temporally different points.

An aspect of the present is a drive coil assembly comprising two or more serpentine drive coils rings. The several rings of the assembly are positioned around the circumference of the probe and the spatial phase of the undulation of each ring is chosen so as to uniformly distribute the lobes of the undulations around the circumference of the probe, and the rings are all driven with an input signal with the same specific frequency and a different relative temporal phase, chosen such that (1) the net current around the circumference of the probe is zero and (2) the eddy current distribution created in the tubing wall at any specific instant in time has regions in which the prevailing current direction is circumferential, and other regions in which the prevailing current direction is axial or diagonal, and the prevailing eddy current direction for a region is different at different instants in time during the probe scan. The prevailing current directions may be oriented at any desired angle relative to the tube axis, so long as the current in each section of the tube changes through a minimum of two directions orthogonal to each other. In alternate embodiments, if flaws are expected to be more common along specific directions relative to the tube axis, the geometry of the eddy current drive coils may be optimized to generate a current pattern that is biased so as to increase sensitivity along the desired direction relative to sensitivity along directions which are of lesser interest.

Optionally, the distinct serpentine rings of the assembly may have slightly different radii so that they may be arranged concentrically within the tube without touching each other, or the wire turns of the rings may be interwoven, so long as there is not an electrical short between the rings. Also optionally, the rings may be spaced along the axial direction so as to achieve a specific desirable eddy current distribution, which may be optimized using finite element modeling or any other method known in the art.

The configuration shown in FIG. 6a is a preferred embodiment of the invention. Three ring shaped conductors 610, 620 and 630 are arranged around the body of a probe. Each ring consists of a serpentine of an integer number of sinusoidal cycles around the circumference of the probe; each cycle comprises two lobes, one protruding in the positive axial direction and the other protruding in the negative axial direction. The spatial phase of the oscillation, i.e. the starting point for each lobe relative to the other rings, is chosen so that the lobes of all the rings are evenly distributed around the circumference. For three rings, the spatial relative phase between the lobes of the three rings is 60°.

In another embodiment of the invention, the serpentine rings of the drive coil are slightly larger than the external diameter of a tube, pipe, or rod and the assembly is used as an external encircling coil, as shown in FIG. 6b.

An electrical signal is applied to each of the three conductors to create an electric current with a specific frequency and phase. The frequency and amplitude of the current is chosen according to the material and thickness of the wall of the tube to be tested according to methods established in the art. The relative temporal phase of the current in the three conductors is chosen so that the sum of the phases is zero. Thus the phase of the electrical current in the first ring 610 may be driven at a phase of zero relative to an arbitrary temporal reference, the electrical current in the second ring 620 would be driven at a temporal phase of +120° to the first ring 610, and the electrical current in the third ring 630 driven at a phase of −120° to the first ring 610.

For a different number of rings the spatial and temporal phases would be chosen so that the lobes are uniformly distributed about the circumference and the sum of the temporal phases is zero. Optionally, the relative phase between the rings or the reference phase for the first ring may be varied in time in order to enhance the sensitivity of the probe and/or to enable specific detection or data analysis algorithms to be utilized. Alternately, each ring may be driven at a unique frequency which may differ from the frequency of the other rings for the purposes of enhancing detection or to enhance detection sensitivity or data analysis.

In this manner, the net current around the circumference of the tube is zero. Thus there is no net magnetic dipole moment. This minimizes the spatial extent of the magnetic fields created by the inspection probe and thus minimizes the interaction of the inspection probe with external structures such as mounting brackets, manifolds, etc.

While the net dipole moment for the entire ring is zero, the lobes of the three conducting rings form a network of small circulating currents, each of which has a dipole moment oriented along a diameter of the probe. These create a pattern of circulating eddy current whorls through the tube wall. This pattern is maintained through the thickness of the pipe wall and the magnetic field distribution is localized and relatively insensitive to external objects or structures. Defects in the tube wall disrupt the pattern of eddy currents creating a magnetic signature. The signature is accentuated for defects that are orthogonal to the instantaneous eddy current direction at the location of the defect. Since each point in the tube wall experiences different eddy current directions over time due to the translation of the probe through the tube during the inspection, defects oriented along any direction may be detected. FIGS. 6d and 6e show the eddy current intensity and direction in the outer surface of a tube wall with a circumferential defect 650, at two different instances during the period of the temporal oscillation. It is evident that for that specific configuration and at that specific moment in the cycle and position in the scan the eddy currents are essentially parallel to the defect, but that as the probe translates through the tube there will be times at which the eddy currents will flow at an angle to the defect, enhancing the sensitivity of the system to the defect.

It may be advantageous to drive each of the traces at a slightly different frequency, and/or let the phase between them vary slightly (either rotate them all in sync or modulate the phase around 120°). This may be useful for detection sensitivity, noise rejection, or data analysis purposes. However, it is not desirable to drive them sequentially, i.e. to pulse the current in the rings so that only one carries electrical current at any instant in time, since if the current flows through a single serpentine trace, the undulations become washed out by the thickness of the wall, and for sufficiently thick walls (several millimeters) the eddy current on the far side would be equivalent to that of a simple bobbin. For the same reason, it is not desirable to significantly separate the rings axially. It is the interaction between the currents (specifically the interaction between the magnetic flux lines associated with the currents) which maintains the current pattern inside the material.

Figure 7:
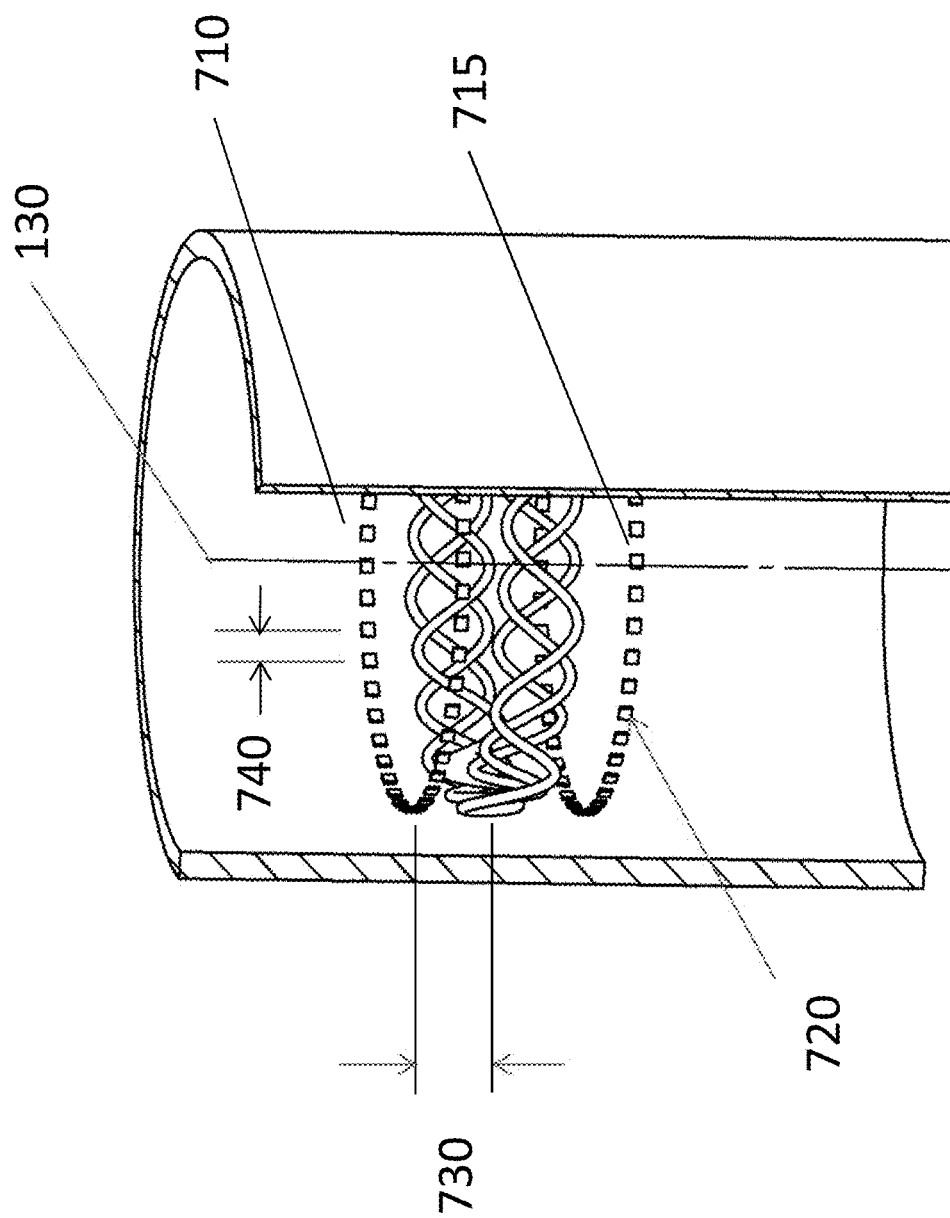
FIG. 7 shows the geometry of a model excitation and sensing system.

In conjunction with the drive coils, an eddy current inspection system requires one or more sensors or arrays of sensors to detect the magnetic signature created by defects in the test object. In some cases, the same structures used for driving the eddy current may be utilized for the detection of the magnetic signature, either simultaneously with the drive signal or at different times. In other cases, the probe may be provided with a distinct sensor or array of sensors. The drive coil configuration described in the present invention is particularly suitable for being used in conjunction with one or more sensor arrays. A schematic of such a configuration is shown in FIG. 7. Each array 710, 715 comprises a plurality of sensors 720 disposed around the circumference of the probe at an axial position 730 chosen to optimize the sensitivity of the probe. The sensor arrays can extend around the entire circumference or only cover part of it, depending on the system requirements. Multiple arrays can be placed on the same or opposite sides of the drive coils and at arbitrary axial positions as determined by the system design.

The magnetic field detected by the sensors is a superposition of four components: (1) the magnetic field created by the drive coils, (2) the magnetic field due to the steady state eddy current distribution, (3) the magnetic field perturbations due to the disruption of the eddy current flow distribution caused by defects in the tube wall, and (4) any external fields present. The first two contributions to the field are constant in time, except for the oscillation at the drive frequency; the perturbation is the signal of interest, and the external fields contribute to the noise. The sensing electronics may be configured to reject the steady state background signal and slowly varying external signals, and only respond to the deviation observed as the probe translates past a defect. The rejection of the background signal may be accomplished by any means known in the art including but not limited to differential sensing and/or digital or analog post-processing.

The axial position of the sensors may be chosen to minimize the background signal, to maximize the signal associated with the defect to be detected, or to maximize the ratio of the defect signal to the background signal. The spatial pitch 740 of the sensors around the circumference may be chosen to maximize the probability of detection of a defect of a given size, or according to other limitations of the system including cabling, multiplexing, and post-processing capabilities.

Some sensors have a response which is dependent on the direction of the local magnetic field. Such sensors include but are not limited to: solenoids, magnetoresistive sensors including anisotropic magnetoresistance (AMR), giant magnetoresistance (GMR), spin-valve, and Hall effect sensors. Typically, the background field will be greatest in the radial direction, smaller in the axial direction, and smallest in the tangential direction, so it may advantageous to orienting the sensors to detect the tangential component of the magnetic field. However, the sensors may be oriented to detect any desired direction of the magnetic field according to the specific requirements for the measurement system.

Differential sensing may be used to enhance the sensitivity of the probe and/or to minimize the sensitivity to external structures or objects or to background fields. The differential sensing may be configured to be between arrays of sensors axially positioned on either side of the drive coil assembly, for example arrays 710 and 715 in FIG. 7, or between separate sensors of a single circumferential array of sensors. In any case, however, the differential sensing should be configured between sensors positioned so as to experience similar direct coupling to the drive coil in terms of magnitude, direction, and phase, so that differences between the signals can be unambiguously attributed to the presence of an anomaly in the scan.

Optionally, multiple arrays of sensors may be used. The direction of sensitivity of each array may be independently chosen. Optionally, the sensors may be configured so as to detect all three axes of the magnetic field.

Some types of sensors exhibit non-linear behavior such as saturation and may therefore benefit from a position where the background field is low. This condition may be met in one of several ways, including choosing a distance between the sensor and the drive coil such that the background field is adequately low or orienting the sensor such that the significant component of the background field is aligned with a direction in which the sensor is not sensitive, and such that the sensor responds to field components which are low or absent in the background field. In one embodiment of the invention, the magnetic sensor is an anisotropic magnetoresistive (AMR) sensor comprising a material whose magnetic polarity may switch directions when exposed to magnetic fields which exceed a certain maximum level, so it is generally desirable to choose a placement where the direct field generated by the drive coil remains below the threshold filed.

Furthermore, AMR sensors have a highly directional sensitivity, so it may be desirable to align them so as to respond to tangential field components, which are generally smaller than the maximum axial and radial components of the direct field. Nevertheless, in other situations and for other drive coil designs it may be desirable to sense other field directions. Furthermore, other field components may impact the measurement either because of tolerance in the alignment of the sensor or because noise in the sensor response or the system sensitivity to background objects may depend on the total magnitude of the magnetic field and not on the magnitude of a specific component, so the entire magnetic field distribution should be considered in the system design.

The shape and size of the lobes of the eddy current generating coils can be optimized for specific tube diameters, wall thicknesses, tube material, desired minimum defect sensitivity, threshold defect size and shape, or any other parameter. The lobes shown in FIGS. 4*a*, 5*a*, 6*a*, 6*b*, and 7 are sinusoidal in shape, but they may be made rectangular, trapezoidal, cycloidal, or any other shape. The size and shape of the lobes of the drive coils, as well as the number of lobes to be arranged around the circumference, may be optimized by any means known in the art, including experimental methods and/or finite element modeling.

The number of lobes around the perimeter of the probe may be chosen to optimize the magnitude of the signal and or the ratio between the signal amplitude and the background field at a desired location of the sensor array. The optimum number may depend on the tube diameter, the size of the defect, the position of the defect, the material of the tube, the desired spatial resolution, or any other parameters of the system. The optimum design parameters may be determined using computer modeling, including but not limited to finite element modeling, and/or physical experimentation. The process of optimizing the number of lobes may be understood by referring to FIGS. 7-10. The figures show the results of a finite element computer model for the tri-phase configuration shown in FIG. 6*a*, for several different numbers of lobes and for both circumferential and axial defects. These results are intended to illustrate the optimization process and are not intended to limit the scope of the invention. The model parameters are summarized in Table 1 below

TABLE 1

| Parameter | Value |
| --- | --- |
| Tube material | Inconel 600 (nominal material property values) |
| Tube diameter | 15.8 mm |
| Tube wall thickness | 1.5 mm |
| Lift off | 1 mm |
| Number of phases | 3 |
| Number of serpentine cycles | Varied |
| Spatial amplitude of serpentine | 1.4 mm |
| Defect length | 1 mm |
| Defect depth | .4 mm |
| Defect thickness | .1 mm |
| Defect location | $2^{nd}$ surface |
| Sensor array | 3.5 mm axial distance from center of drive coil |

In the model, the axial scanning of the probe was simulated by varying the axial spacing between the center of the drive coil assembly between −8 mm and 8 mm in 0.5 mm steps. Calculations were made for both axially and circumferentially oriented second side defects (outer surface of the tube), with the center of the defect at axial position 0 mm FIGS. 6*d* and 6*e* show a typical eddy current distribution around a circumferential defect. It is evident that the defect interrupts the local eddy current, and that as the probe is translated through the tube, the local eddy current direction at the defect will change, so that any defect will pass through at least some regions in which it is not parallel to the local eddy current direction and therefore it will create an electromagnetic signature. The amplitude and phase of the magnetic signature at the sensor location will depend on the magnitude of the eddy current, the direction of the eddy current when the defect is close to the sensor, and on other parameters of the system. Thus the response of the probe to any defect depends on these system parameters, including the amplitude and number of lobes in the serpentine drive coils. The optimization of the multi-parameter design may be made by trial and error or by systematic methods known in the art; the data shown here for a single variable serves to illustrate the process.

Figure 8:
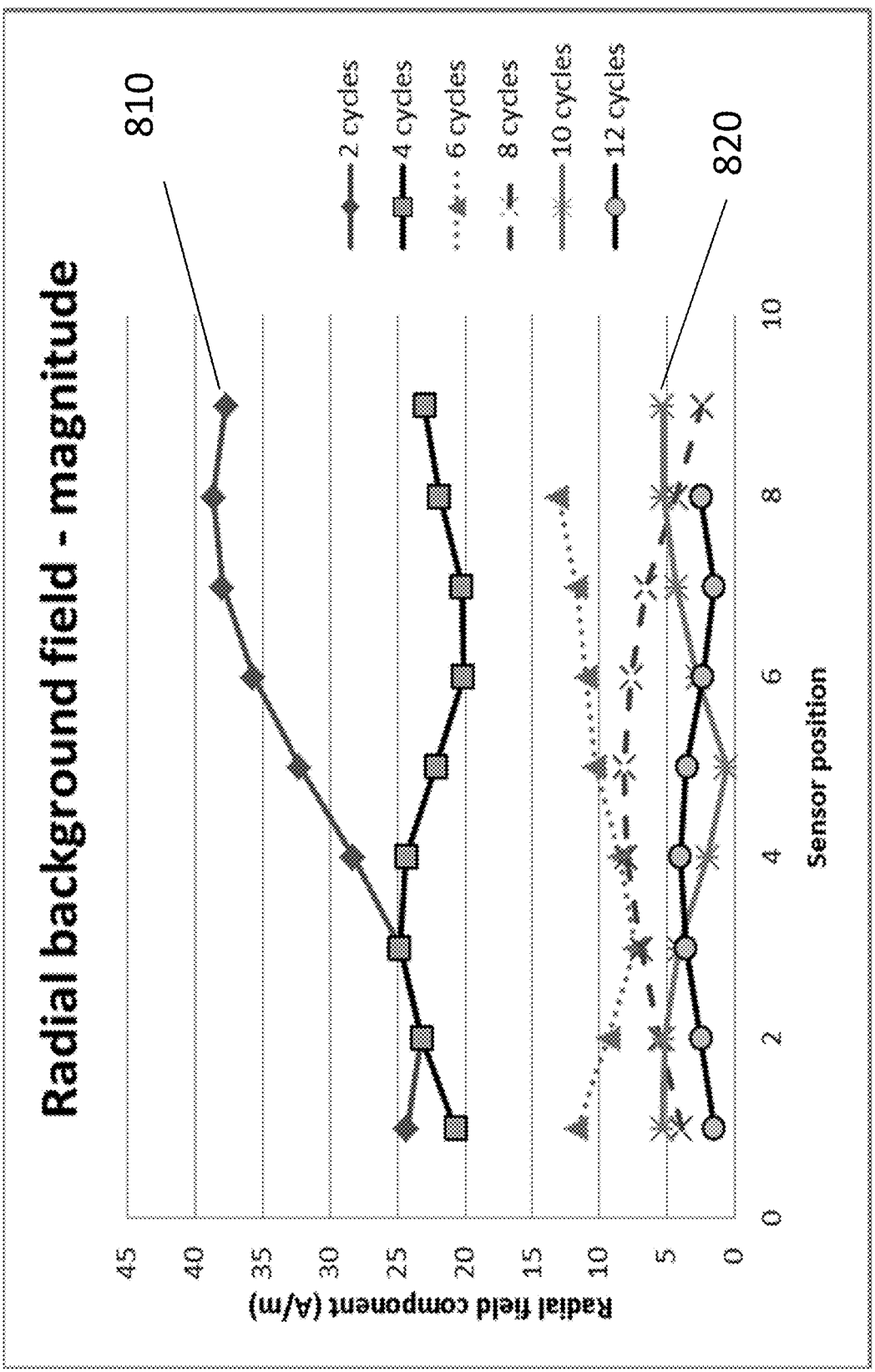
FIG. 8 shows the magnitude of the radial component of the magnetic field for the model in FIG. 7 at ten sensor positions.

FIG. 7 shows the geometry of the model and FIG. 8 shows the magnitude of the radial component of the magnetic field (absolute value of the complex number result) calculated for a row of sensors covering less than the full circumference depicted in FIG. 7. The sensors are 3.5 mm from the center of the drive coil assembly and detecting the radial component of the magnetic field, for a different numbers of lobes in each serpentine coil. The structure in the response is due to the local variation in the amplitude and phase of the background signal. As would be expected, systems with fewer lobes not only have larger background fields but also have greater variation in the background field. This variation is larger than the signature attributable to any defect. For example, in the case presented here, the average field for the system with two lobes 810 is 30 A/m and the total variation is 27 A/m, whereas for a 10 cycle system 820 the average field is 2.5 A/m and the variation is 5 A/m.

Figure 9A:
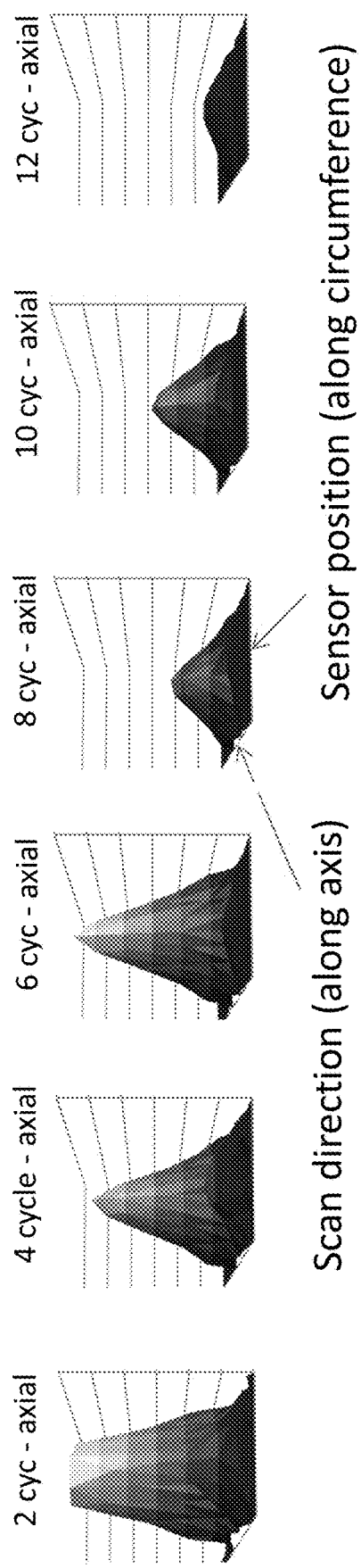
FIGS. 9a and 9b show the background subtracted data for both axial and circumferential defects for systems with different numbers of lobes.
Figure 9B:
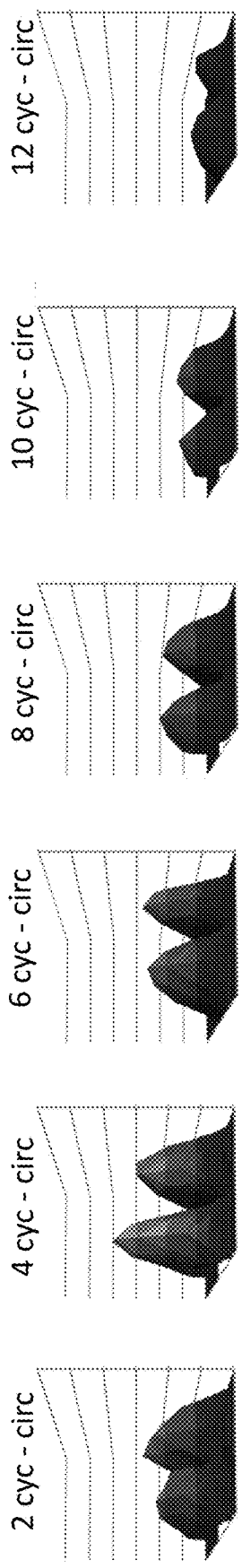

When the background signal is subtracted from the scan data, the response attributable to the defect becomes evident. FIG. 9 shows the background subtracted data for both axial (upper set) and circumferential (lower set) defects for systems with different numbers of lobes. The field is measured at 9 positions along the circumference of the probe, corresponding to nine potential positions for sensors in a sensor array. The horizontal axis of the figure corresponds to the sensor positions, while the depth axis is the scan direction and represents axial position, or, equivalently, time, and all the figures are plotted to the same vertical scale. Referring to the figure, it may be observed that the magnitude of the response depends on the number of lobes; with only two lobes, for example, the direction of the current is generally circumferential and the response for a circumferential defect is compromised, while the response for axial defects is very strong. On the other hand, for twelve lobes, the response is comparable in magnitude for axial and circumferential defects, but because the eddy currents are highly localized the overall fields are small and therefore the absolute magnitude of the response is small. Note that the effect of the number of lobes will change for different tube diameters and undulation amplitude. Note too that for modeling purposes the field was evaluated at the nine sensor positions indicated on FIG. 9, but that the sensor distribution in a probe may include additional, fewer, or different sensor locations as desired. Most commonly, the sensor array would extend around the complete circumference of the probe so that it covers the entire surface of the tube or pipe to be examined.

In some cases, the ratio of the response to the background field is a better metric for the optimization of the probe design than the absolute magnitude of the response. This may lead to a different optimum number of lobes because the magnitude of the background field varies with the number of lobes. FIG. 10 shows the same data as FIG. 9, but in this case it has been normalized to the local background field. In this case, the optimum number of lobes appears to be 10 to 12.

Figure 11:
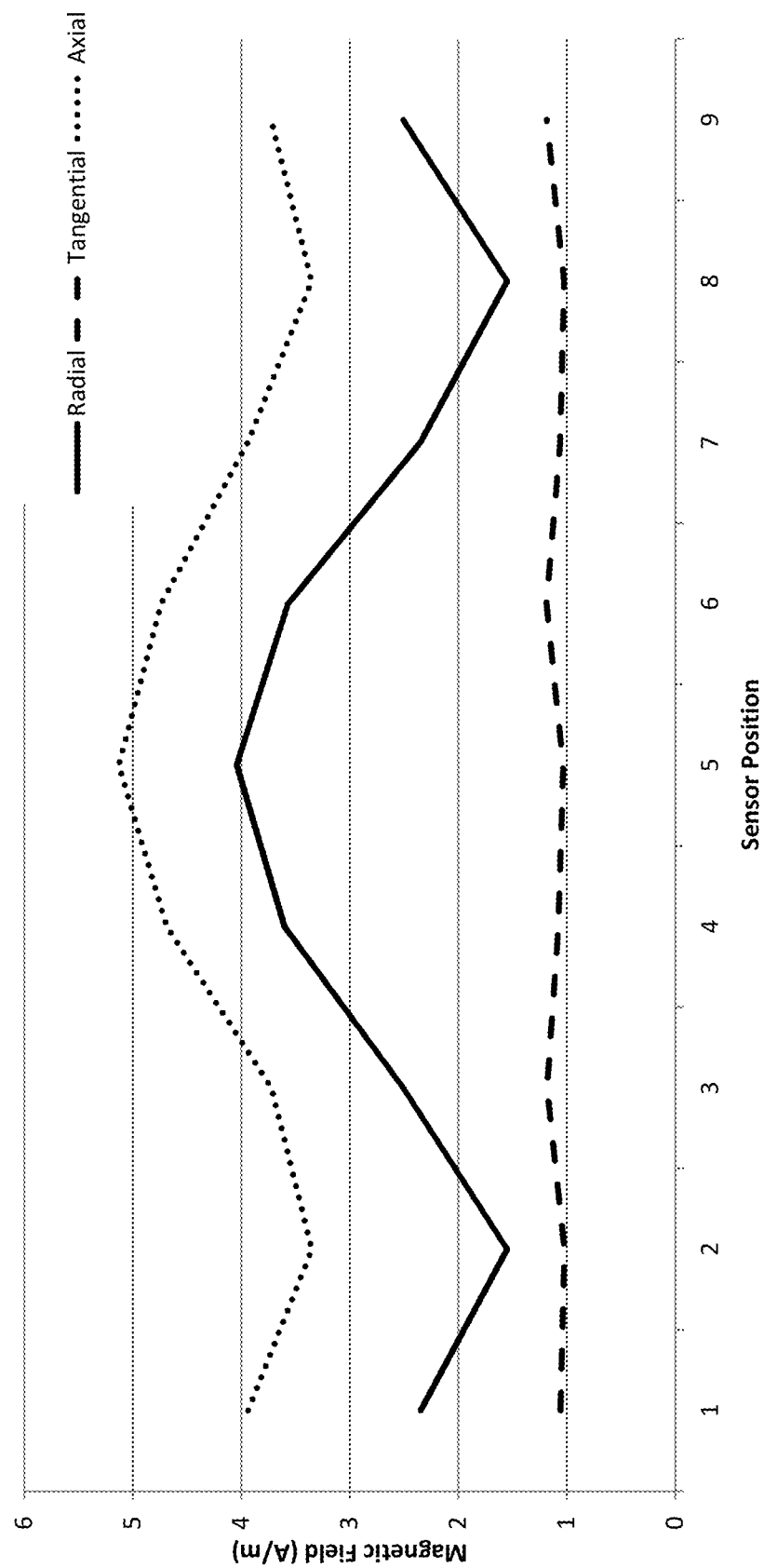
FIG. 11 shows a summary of the magnitude of the different components of the magnetic field for various coil configurations according to the invention.
Figure 12A:
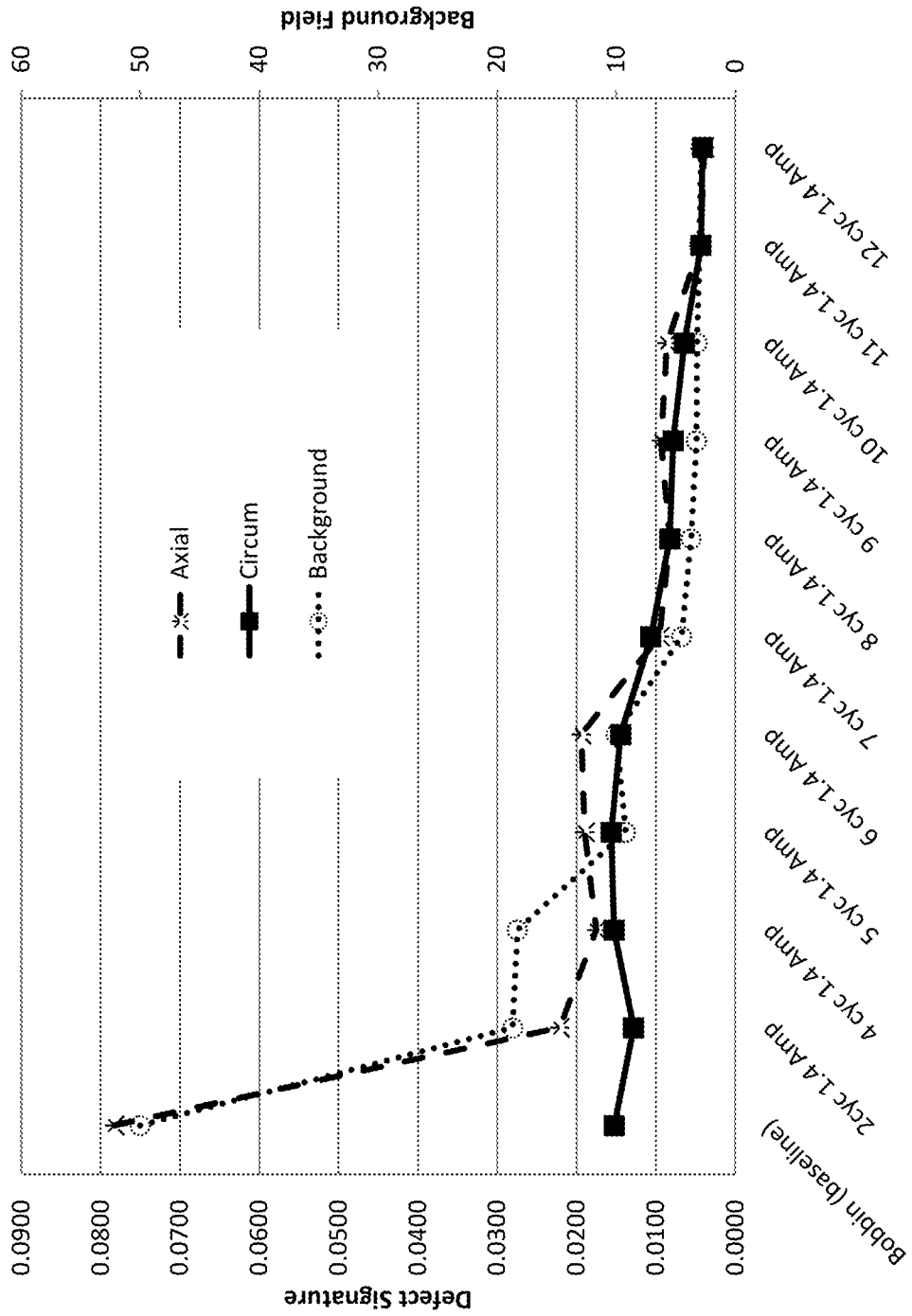
FIG. 12a shows the magnitude of the background subtracted response.
Figure 12B:
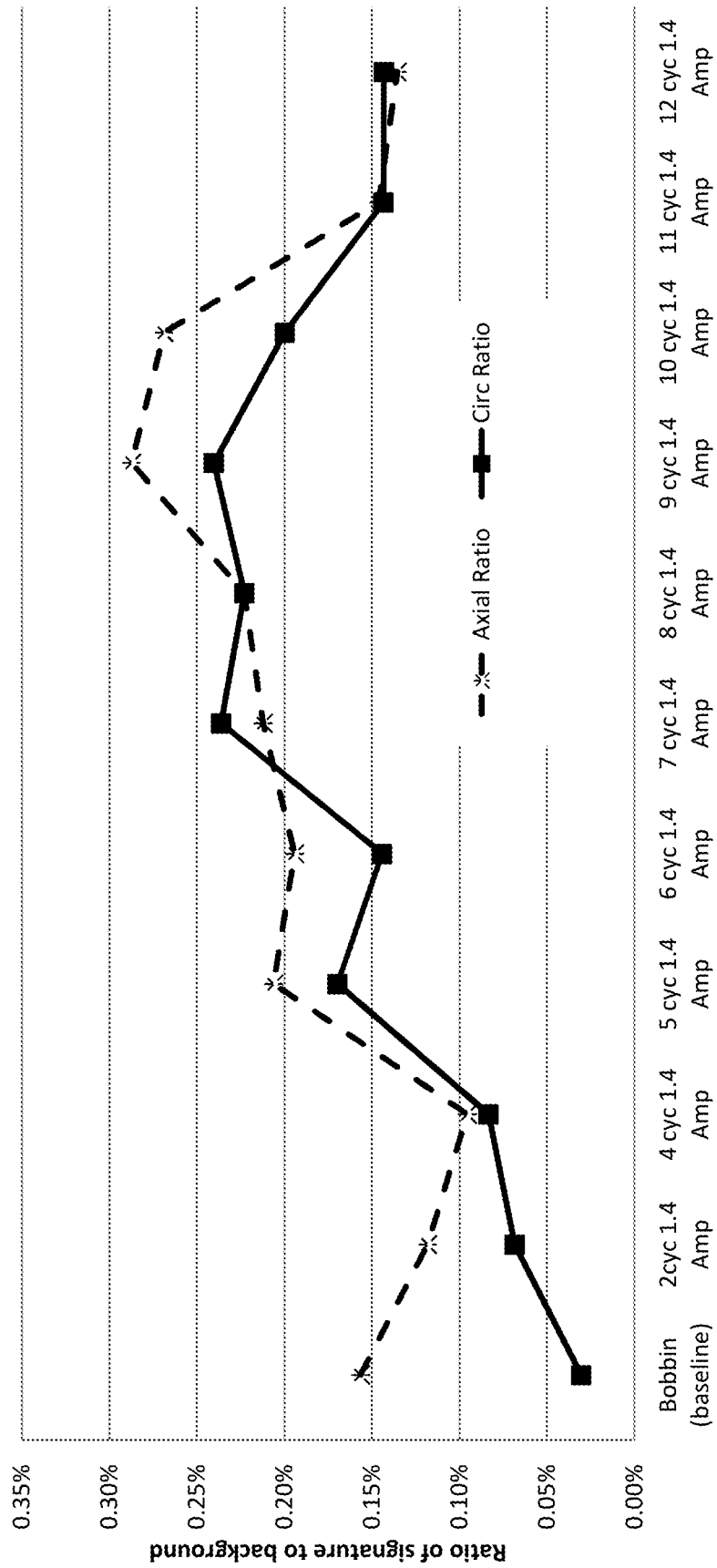
FIG. 12b shows the ratio of the response to the background field.

FIG. 11 shows a summary of the magnitude of the different vector components of the magnetic field. It is evident that the tangential component of the background field is much smaller than the radial or axial component, and for that reason it may be preferable to use directionally sensitive sensors and to orient their sensitive axis in the tangential direction. FIG. 12*a* shows the magnitude of the background subtracted response, while FIG. 12*b* shows the ratio of the response to the background field. Here, the optimum number of lobes is estimated to be approximately 10 lobes.

For similar reasons, depending on the system parameters and the type of sensors used, it may be advantageous to place the sensors closer to or further away from the drive coil assembly. The other parameters of the system, including but not limited to sensor position and pitch, and shape and amplitude of the lobes can be optimized in a similar manner.

The detector array in the present invention could also consist of discrete coils, coils formed by photolithography methods, or any other magnetic detector.

Figure 13B:
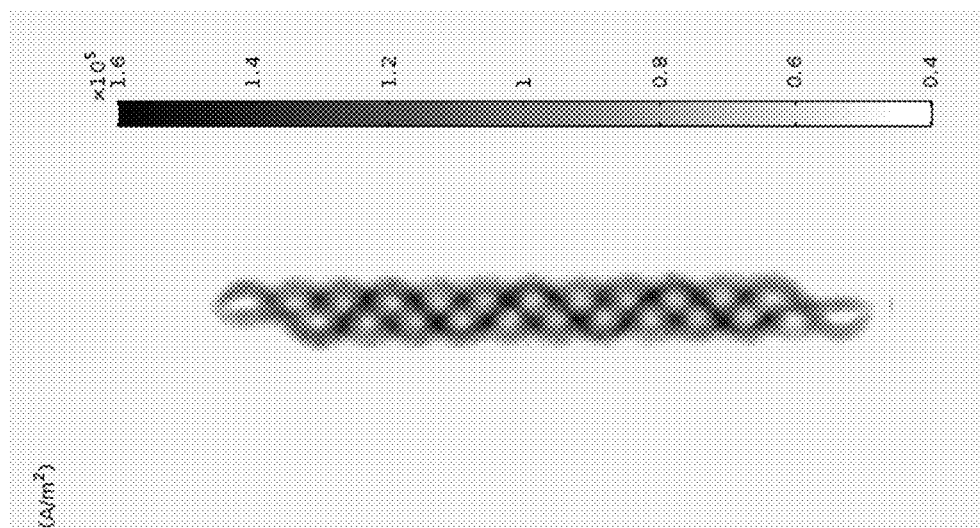
Figure 13A:
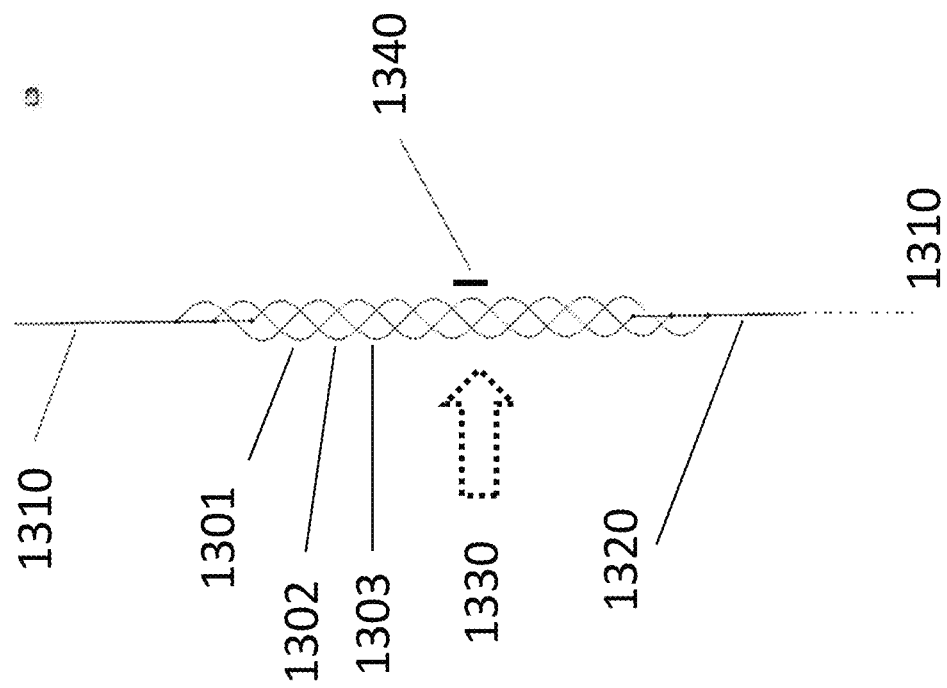
FIG. 13a shows a schematic of a planar version of the inventive current drive design.

In an alternative embodiment of the invention, the conducting serpentine paths are arranged along a plane instead of wound along a cylindrical surface. This configuration is shown in FIG. 13. FIG. 13*a* shows the three serpentine paths 1301, 1302 and 1303, arranged along a common axis 1310 and in such a manner that the lobes are evenly spaced along the common axis. The conductors may either each occupy a distinct spatial layer, or may consist of insulated wires intertwined along the vertical dimensions, but in any case are electrically isolated from each other and are driven with an alternating electrical current at a relative temporal phase of 120° from each other. The supply lines 1320 and 1330 also consist of three conductors driven at a relative temporal phase of 120°, and should be arranged in close proximity to each other. They therefore carry no net current and thus generate no eddy current or magnetic field. They may furthermore be bent or curved out of the plane in which the serpentine traces are formed in whatever manner is required to form a functional probe. The eddy current pattern generated by such an arrangement is shown in FIG. 13B. It is evident that if the probe is scanned along the direction 1330 perpendicular to the common axis 1310, a defect 1340 will, at some point in the scan, encounter eddy currents which are not parallel to its predominant direction.

This configuration is suitable for the inspection of objects and surfaces which do not have cylindrical symmetry. For objects which are largely planar the supporting structure and the traces may be fabricated out of rigid or semi-rigid materials. For objects which have some curvature, the traces may be fabricated on a flexible substrate, including but not limited to Kapton, silicone, mylar, fabric, or woven fiberglass sheet. The substrate may be supported by a rigid element which is shaped so as to match the curvature of the surface, or it may be placed on a flexible or articulated structure which actively conforms to the shape of the surface during the scan. Furthermore, it is also feasible to wrap a flexible substrate around a cylindrical support in order to utilize a flexible substrate to inspect tubular surfaces. This arrangement may offer one or more advantages including but not limited to manufacturing cost, adaptability of a probe to different tube diameters, or durability.

What is claimed is:

1. An eddy current generation system for inspection of a tubular object comprising electrically conductive material, comprising
an alternating current source; and
a first current-carrying structure having a circular perimeter and comprising:
a plurality of current carrying paths, wherein said paths are substantially concentric about a common axis and are further spatially modulated in the axial direction, so that each of said one or more paths has an integer number of axial undulations around the perimeter of the structure, said axial undulations being spatially phased, and
wherein said alternating current source supplies each of said current carrying paths with an excitation current having a fixed temporal phase and said temporal phases of the currents supplied to the plurality of current carrying paths are configured so that net current about the common axis is zero.

2. The system of claim 1 wherein said undulations are shaped to optimize the distribution of eddy current in the wall of the tubular object.

3. The system of claim 2 wherein said undulations have a shape that is a sinusoidal shape or a cycloid shape.

4. The system of claim 1 wherein the spatial phases of the axial undulations of said current paths are arranged such the axial undulations are uniformly distributed about the circumference of the first current-carrying structure.

5. The system of claim 1 wherein a temporal frequency of the electrical current in each of the conducting paths is the same.

6. The system of claim 1 wherein temporal frequency of the different electrical currents in each of the current-carrying paths is different.

7. The system of claim 1 further comprising a first sensor array of magnetic field sensors.

8. The system of claim 7 wherein said first current-carrying structure produces a background magnetic field and where a spatial phase and pitch of the location of said array of magnetic field sensors is configured to provide symmetries in the background magnetic field.

9. The system of claim 7 wherein said first current-carrying structure produces a magnetic field and wherein said magnetic field sensors are oriented to detect a directional component of the magnetic field.

10. The system of claim 9 wherein said directional component is normal to a surface of the tubular object, parallel to the axis of the tubular object or tangential to a surface of the tubular object.

11. The system of claim 7 wherein the first sensor array comprises one or more of inductive coils, solid state sensors, AMR sensors, GMR sensors, Hall sensors, valve sensors, TMR sensors or magneto-optic sensors.

12. The system of claim 7 further comprising a second sensor array wherein said first sensor array is located axially adjacent to a first side of said current carrying paths and said second sensor array is located axially adjacent to a second side of said current carrying paths.

13. The system of claim 12 wherein the second sensor array is utilized to provide a signal reference for differential sensing.

14. The system of claim 12 wherein the second sensor array is utilized to increase a circumferential resolution of the instrument.

15. The system of claim 1 wherein said current carrying paths are fabricated from one or more of: discrete wires, photolithographically produced conductors, subtractive fabrication or additive fabrication.

16. The system of claim 3 wherein said current carrying paths are either fabricated on a flexible substrate which is subsequently formed into a cylindrical shape or directly formed on a rigid or semi-rigid probe body.

17. An eddy current generation system for inspection of an object of planar or arbitrary shape comprising electrically conductive material comprising
an alternating current source; and
a structure having a substantially planar disposition and a linear axis contained within the plane and comprising:
a plurality of current carrying paths, wherein said paths are generally disposed along a common axis and are further spatially modulated in the plane in a direction orthogonal to the common axis, so that each path has an integer number of axial undulations, and spatial phasing of the undulations relative to each of said current carrying paths is uniformly distributed along the common axis,
wherein said alternating current source supplies each of said current carrying paths with an excitation current having a fixed temporal phase and said temporal phases of the currents supplied to the plurality of current carrying paths are configured so that net current about the common axis is zero.

18. The eddy current generation system of claim 17 formed on a rigid flat substrate, a rigid shaped substrate, a flexible substrate, or an articulated substrate.

19. The eddy current generation system of claim 17 further comprising one or more magnetic sensors.

* * * * *